INVENTOR.
NORTON W. BELL
BY
ATTORNEYS

INVENTOR.
NORTON W. BELL
BY
ATTORNEYS.

United States Patent Office 2,895,059
Patented July 14, 1959

2,895,059

FLOATING POWER SUPPLY CIRCUIT

Norton W. Bell, Monrovia, Calif., assignor to Consolidated Electrodynamics Corporation, Pasadena, Calif., a corporation of California Application June 21, 1957, Serial No. 667,228

3 Claims. (Cl. 307—105)

This invention relates to D.C. power supplies, and more particularly, is concerned with providing a voltage source well isolated from ground.

Where the output of a fullwave rectifier has to operate into a load which is not grounded, or which is tied to ground by a very high impedance, objectionable ripple currents may be present which cannot be filtered out by ordinary techniques. For example, if a large capacitor is provided to bypass the ripple of currents to ground, it could produce an undesirably long time response to transients produced by switching of loads, or the like.

The present invention provides a rectifier power supply having an output which is floating with respect to ground, and yet provides a very low ripple voltage without the use of large bypassing condensers to ground. To this end, the present invention provides a circuit including a conventional fullwave rectifier with filter operating into a useful load. In addition, a second fullwave rectifier of opposite output polarity with a dummyload is connected to the same transformer. This second rectifier and load has no useful purpose other than to make the transformer circuit symmetrical. As a result the ripple currents to ground are balanced out, as will hereinafter become more apparent.

For a better understanding of the invention, reference should be had to the accompanying drawings, wherein.

Figure 1:
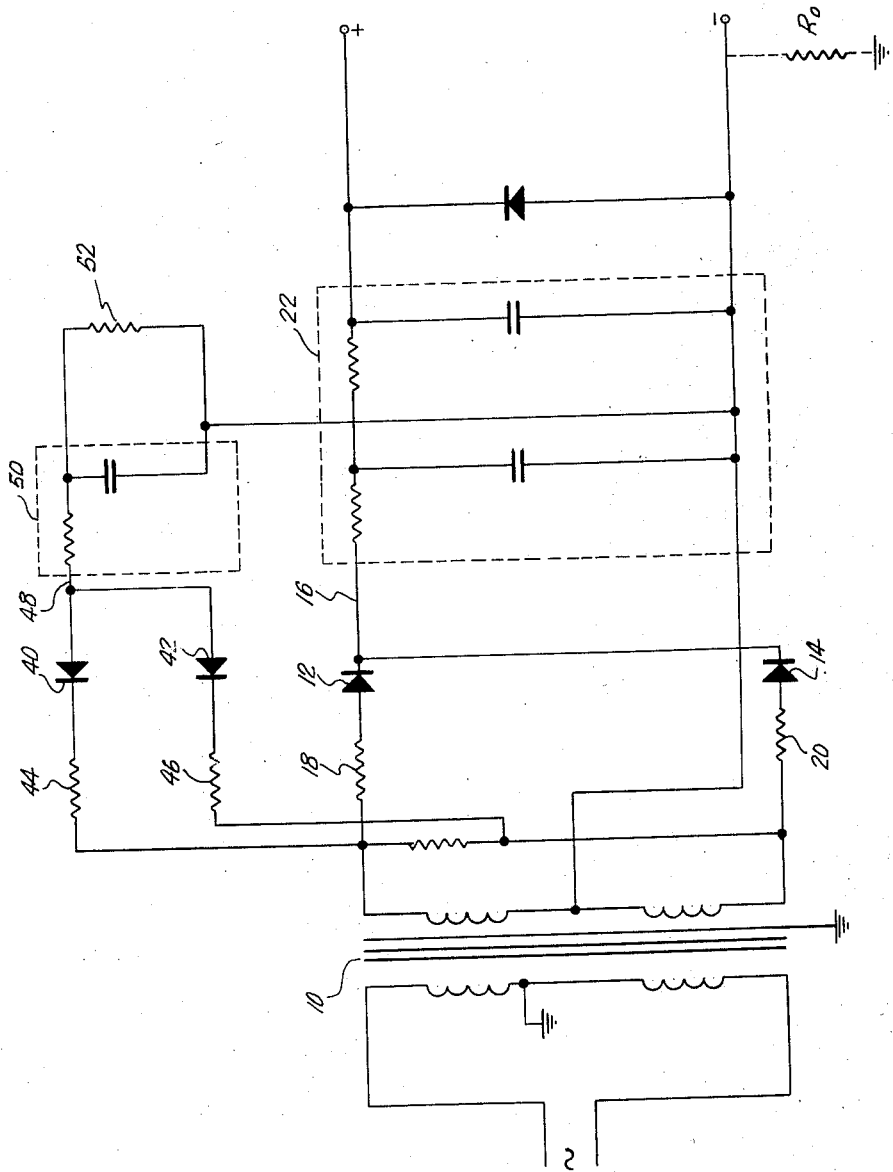
Fig. 1 is a schematic wiring diagram of the power supply of the present invention.

Referring to Fig. 1 in detail, the numeral 10 indicates a power supply transformer having a center-tapped secondary winding. A transformer having balanced type construction is desirable to minimize ripple currents due to secondary capacity unbalance to ground of the secondary winding of the power transformer. A pair of diodes 12 and 14 connect opposite ends of the secondary of the transformer 10 to a common output lead 16. The resistors 18 and 20 may be provided in series with the diodes 12 and 14 for current limiting purposes.

A conventional RC circuit, as indicated generally at 22, may be provided for filtering the output of the fullwave rectifier provided by the diodes 12 and 14. The input to the filter 22 is connected between the center tap of the secondary of the transformer 10 and the common output lead 16. Voltage regulation may be provided by a Zener diode 24 connected across the output of the filter 22 for maintaining the output voltage fixed over a large range of load changes on the output.

Figure 2:
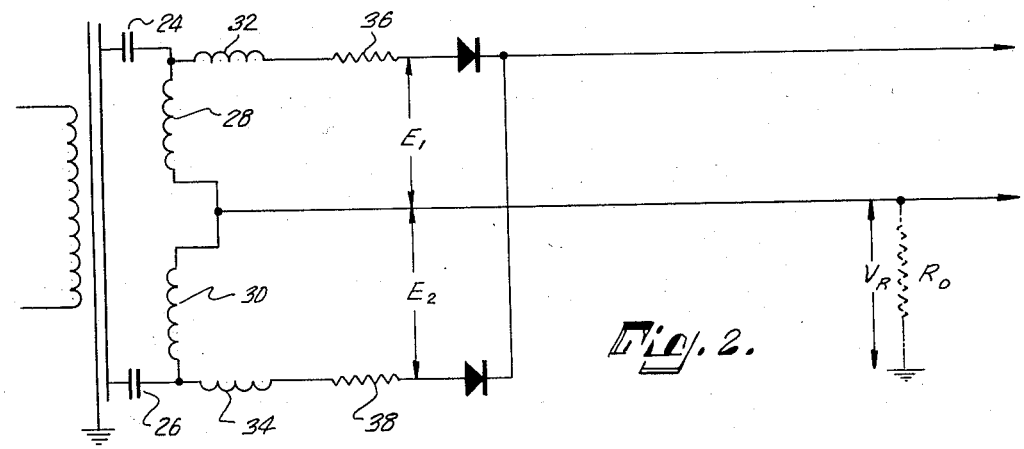
Fig. 2 is an equivalent circuit which shows the source of ripple and is useful in explaining the operation of the present invention.

The circuit as thus far described comprises a conventional fullwave rectifier with the output floating with respect to ground. A resistor $R_0$, shown dotted in the figure, indicates a high impedance current path to ground at the output of the power supply. Referring to Fig. 2, the equivalent circuit of the power transformer is shown, which includes distributed capacity to ground, as indicated by the capacitors 24 and 26, the secondary of the transformer 10 also includes in addition to the mutual inductance of the windings 28 and 30, leakage inductance indicated at 32 and 34, and D.C. winding resistance indicated at 36 and 38.

Figure 3:
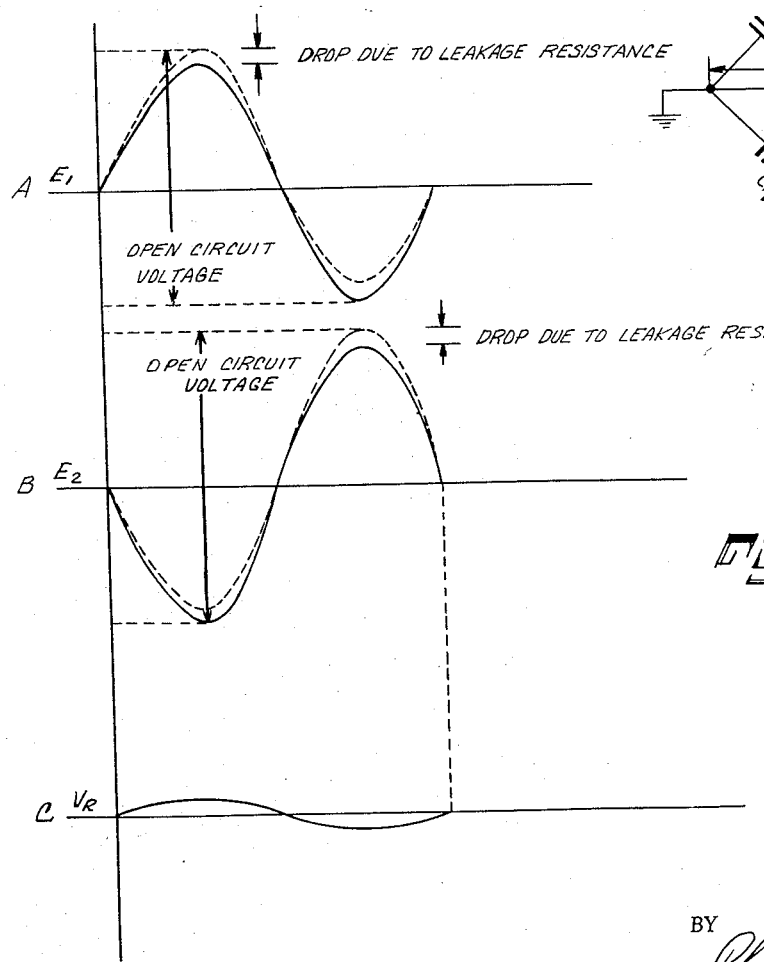
Fig. 3 is a series of wave forms useful in explaining the operation of the present invention.

Fig. 3a shows the voltage wave forms appearing in the circuit of Fig. 2. Thus the voltage $E_1$, on the initial positive halfcycle as shown, does not reach the open circuit voltage indicated by the dotted line, but is reduced in amplitude by the amount of the voltage drop across the leakage resistance 36. On the non-conductive halfcycle, the voltage $E_1$ reaches its open circuit value. Similarly, the voltage $E_2$ across the other half of the secondary on its non-conductive halfcycle reaches its full open circuit voltage, but on its conductive halfcycle it is reduced by the IR drop in the leakage resistance. The resulting ripple voltage $V_r$ appearing across the high resistance to ground is shown in Fig. 3c.

Figure 4:
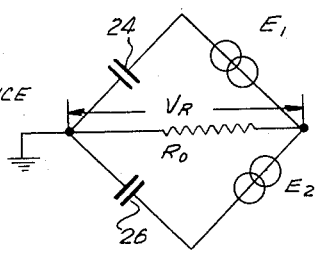
Fig. 4 is a schematic circuit diagram.

This voltage swing $V_r$ in the center point of the secondary can best be appreciated by the equivalent circuit of Fig. 4, which appears as a bridge circuit in which voltages $E_1$ and $E_2$ are applied to two legs of the bridge, the other legs being formed by the distributed leakage capacitance of the capacitors 24 and 26 in the circuit of Fig. 2. Since the peak values of $E_1$ and $E_2$ on alternate halfcycles are unequal, a ripple voltage $V_r$ exists. It is the resulting ripple voltage $V_r$ which is substantially eliminated by the present invention.

Referring again to Fig. 1, a second fullwave rectifier circuit is provided including a pair of diodes 40 and 42 connected to opposite ends of the secondary of the transformer 10 through current limiting resistors 44 and 46 respectively. The diodes 40 and 42 are arranged to conduct current in the opposite direction with relation to the secondary of the transformer 10 from the diodes 12 and 14. The two diodes 40 and 42 are connected to a common output lead 48, which in turn is connected through an RC filter to a dummyload resistance 52. The return conductive path is provided to the center tap of the secondary winding of the transformer 10.

The effect of the additional fullwave rectifier with filter and dummyload is to load the two halves of the secondary winding during both half cycles. Thus $E_1$ will not appear as the open circuit voltage during one-half cycle, but will be reduced by the voltage drop in the leakage resistance 36 during both halfcycles. The same is true for $E_2$. The resulting wave form is indicated by the broken line in Figs. 3a and 3b.

Thus the present invention provides a symmetrical network which nullifies ripple voltages otherwise produced by unequal conduction in the two halves of the secondary of a power transformer in a fullwave rectifier during alternate halfcycles. Since equal currents flow in both halves of the secondary of the power transformer during both halfcycles, the source of ripple voltage is eliminated.

What is claimed is:

1. A power supply for supplying a low ripple D.C. voltage output that is floating with respect to ground, said power supply comprising a transformer having a center-tapped secondary winding, the center-tap being maintained at a high impedance with respect to ground, a first pair of diodes respectively connecting opposite ends of the secondary winding to a first common terminal, the diodes being connected to both pass current toward the common terminal, a second pair of diodes respectively connecting opposite ends of the secondary winding to a second common terminal, the diodes being connected to both pass current away from the common terminal, a first filter connected between the first common terminal and the center-tap of the transformer secondary winding, a second filter connected between the second common terminal and the center-tap of the transformer secondary winding, and a pair of substantially equal loads simultaneously and continuously connected respectively to the outputs of the two filters, one of the loads being a useful load and the other load being a dummy load.

2. A power supply for supplying a low ripple D.C. voltage output that is floating with respect to ground, said power supply comprising a transformer having a center-tapped secondary winding, the center-tap being maintained at a high impedance with respect to ground, a first pair of diodes respectively connecting opposite ends of the secondary winding to a first common terminal, the diodes being connected to both pass current toward the common terminal, a second pair of diodes respectively connecting opposite ends of the secondary winding to a second common terminal, the diodes being connected to both pass current away from the common terminal, a first filter connected between the first common terminal and the center-tap of the transformer secondary winding, a second filter connected between the second common terminal and the center-tap of the transformer secondary winding, and a pair of substantially equal loads simultaneously and continuously connected respectively to the outputs of the two filters.

3. A power supply for supplying a low ripple D.C. voltage output that is floating with respect to ground, said power supply comprising a transformer having a center-tapped secondary winding, the center-tap being maintained at a high impedance with respect to ground, a first pair of unidirectional conductive devices respectively connecting opposite ends of the secondary winding to a first common terminal, the unidirectional conductive devices being connected to both pass current toward the common terminal, a second pair of unidirectional conductive devices respectively connecting opposite ends of the secondary winding to a second common terminal, the unidirectional conductive devices being connected to both pass current away from the common terminal, and means for coupling separate loads simultaneously and continuously across the first terminal and the center-tap and across the second terminal and the center-tap whereby equal loads are maintained across both portions of the secondary winding at all times.

References Cited in the file of this patent
UNITED STATES PATENTS
2,728,878     Sperr _____ Dec. 27, 1955